No. 735,357. Patented August 4, 1903.

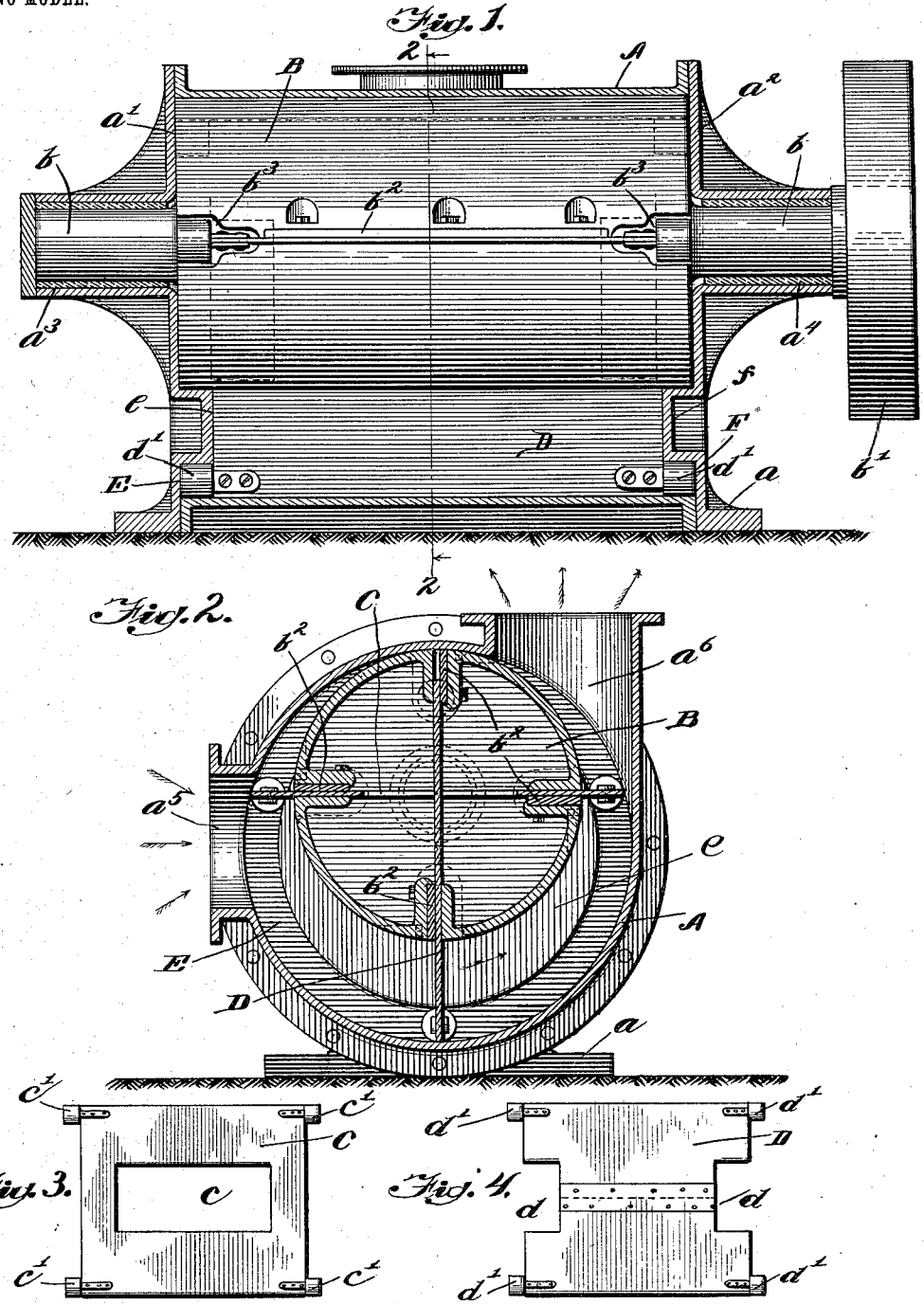

UNITED STATES PATENT OFFICE.

PAUL FORWERG AND BERTINIUS LARSEN, OF CHICAGO, ILLINOIS, ASSIGNORS OF ONE-THIRD TO EMIL JOHNSON, OF CHICAGO, ILLINOIS.

ROTARY BLOWER.

SPECIFICATION forming part of Letters Patent No. 735,357, dated August 4, 1903.

Application filed February 3, 1902. Serial No. 92,284. (No model.)

*To all whom it may concern:*

Be it known that we, PAUL FORWERG and BERTINIUS LARSEN, citizens of the United States, and residents of Chicago, Cook county, Illinois, have invented a certain new and useful Improvement in Rotary Blowers, of which the following is a specification.

Our invention relates to blowers of the class known as positive or pressure blowers, as distinguished from rotary fans, and particularly to a construction of blower involving an eccentric drum provided with a plurality of blades or wings. In blowers of this character the cylinder or casing is usually provided with intake and offtake openings and the drum is mounted eccentrically within the said cylinder. A number of blades or wings are suitably mounted in the drum, and the eccentricity of the drum when rotated causes these blades or wings to move or slide relatively to the drum and in such manner as to be successively brought into position to force the air from the cylinder and out through the offtake.

Generally stated, it is the object of our invention to provide a simple, serviceable, and highly efficient blower of the foregoing character.

A special object is to provide a construction and arrangement which will tend to reduce friction.

Another object is to provide a construction and relative arrangement of the parts which will obviate the necessity of employing certain objectionable and undesirable features of construction.

A further object is to provide a construction which will tend to reduce the cost of manufacture.

It is also an object to provide certain details and features of improvement tending to increase the general efficiency and to render a blower of this character more serviceable and satisfactory in use.

The nature and advantages of our invention will, however, hereinafter more fully appear, and to the foregoing and other useful ends our invention consists in matters hereinafter set forth and claimed.

In the accompanying drawings, Figure 1 is a vertical longitudinal section through a positive or pressure blower constructed in accordance with our invention. Fig. 2 is a vertical transverse section in line 2 2 of Fig. 1. Fig. 3 is a detail elevation of one of the blades or wings. Fig. 4 is a like view of the other blade or wing.

As thus illustrated our invention comprises a casing A, which is cylindric in form and arranged horizontally upon a suitable base $a$. The said cylinder is provided with heads or end walls $a'$ and $a^2$. These heads or end walls can be provided with bearings $a^3$ $a^4$. It will also be observed that the said cylinder is provided with lateral intake and offtake openings $a^5$ $a^6$.

The rotary drum B is provided with axially-alined spindles $b$, mounted to rotate in the bearings $a^3$ and $a^4$. As a means for effecting a rotation of the drum one of said spindles can be provided with a belt or pulley wheel $b'$. This drum B is arranged eccentrically within the cylinder A, its axis about which it rotates being located eccentrically with respect to the longitudinal center or axis of the said cylinder. Preferably the arrangement is such that the periphery of the said drum makes contact with one side of the cylinder, the contact being sufficient to provide a practically tight joint, but not sufficient to prevent the rotation of the drum. As illustrated, the axis of the drum is located above the axis of the cylinder, and consequently the cylindric surface of the drum bears against the upper surface of the cylinder. In this way the interior of the cylinder is practically or substantially crescent shape in cross-section, the chamber having its maximum depth at the bottom and tapering from this point upwardly on each side of the drum.

The means by which the air is drawn in through the intake $a^5$ and then forced out through the offtake $a^6$ consists of the wings or blades C and D. The center portion of the wing or blade C is cut away at its center so as to provide an opening $c$, while the blade or wing D, which it will be observed is made in two parts, is provided at each end with a notch or recess $d$. With this relative formation the two blades or wings are adapted to be arranged crosswise, as shown in Fig. 2, and when thus mounted and operated within the cylinder are capable of a relative shifting or sliding movement. The two blades are readily assembled in place in the drum inasmuch as the blade D is, as stated, made in two parts, the two sections being preferably connected by a piece of sheet metal, as shown in Fig. 4. It will be observed that each blade extends through the drum B and that the point where the two blades cross each other is preferably coincident with the axis about which the drum rotates. In this way the two blades or wings are arranged to have their ends project at opposite sides from the cylindric surface of the drum, and thus arranged at right angles to each other their four end portions are disposed at regular intervals around the periphery of the drum. The lateral slots or openings in which the blades or wings slide are preferably provided with wearing-plates $b^2$. The width of the blades or wings is preferably less than the inner diameter of the cylinder A. With this construction the blades or wings can be provided with antifriction-rolls $c'$ and $d'$, adapted to travel in ways E and F. These ways or grooves may be obtained by providing the cylinder-heads with projections $e$ and $f$, which project into the interior of the cylinder. These projections are, it will be observed, when viewed from the end of the cylinder, or in the direction shown in Fig. 2, substantially crescent-shaped. The said ways or grooves are, it will be observed, formed between the convex surfaces of these projections $e$ and $f$ and the inner surface of the cylinder A. In this way the descending end portion of each wing or blade is held in contact with the cylinder for the full extent of its effective movement. As the blades or wings are of less width than the inner diameter of the casing, the rotary drum is preferably provided with recesses $b^3$, into which the rolls on the wings or blades recede when drawn toward the surface of the drum. In this way the rotation of the drum causes the blades or wings to have a sliding or shifting movement relatively to the drum, each blade or wing projecting first at one side of the drum and then at the other, the rolls alternately engaging the circular way and the pockets or recesses in the drum. The rotation of the drum in the direction indicated by the arrow causes the wings or blades to draw in the air through the intake $a^5$ and to expel the same through the offtake $a^6$.

With the foregoing construction and arrangement we are enabled to employ cylindric surfaces and to avoid the use of irregular surfaces. In other words, the chamber is characterized by perfect cylindricity and the blades are rigid from side to side. Furthermore, the cylindriform chamber thus employed in conjunction with blades which are rigid from side to side is provided at each end with curved ways adapted to receive the projections on the ends of the blades. By the statement that the blades are rigid from side to side we mean that each blade is continuous and stiff and rigid from one contact edge to the other contact edge; also, by the terms cylindric and cylindriform as employed both in the specification and claims we mean a cylinder which has its inner surface formed on the line of a true circle for its full circumference. In other words, by these terms we mean that the chamber of the cylinder is without any irregularities or flattened surfaces whatever. The rolls $d'$ and $c'$ do not, it will be observed, extend beyond the ends of the drum. Thus the rolls are flush with the ends of the drum, the ways for the rolls being provided by forming projections on the inner surfaces of the cylinder-heads. In this way we not only reduce friction and improve the working of the blower, but also provide a construction which tends to reduce the cost of manufacture. With the provision of the rolls and the circular ways the end portions of the blades or wings are caused to travel smoothly and to properly slide or move relatively to the drum without friction or binding. Furthermore, with this construction the blades or wings do not necessarily make positive contact with the surface of the cylinder, and hence friction is reduced to a minimum. As a further advantage the arrangement and construction tend to increase the efficiency of the blower inasmuch as a larger chamber is obtained with a given size of cylinder.

The ways E and F are, it will be seen, arc-shaped in character—that is to say, do not extend for the full circumference of the truly cylindrical chamber. In this way the rolls on the opposite ends of the blades or vanes alternately engage the ways and the pockets or recesses in the rotary drum. In other words, each way ends at the points where the crescent-shaped projections $e$ and $f$ terminate in the tips or ends of the crescents. Thus, as stated, each way only extends for a portion of the circumference of the chamber, thereby allowing the rolls at one end of the blade to be drawn into the pocket of the drum while the other end of such blade is being held in contact, or substantially in contact, with the surface of the casing by reason of the rolls at this end being caused to travel in the segmental ways. This construction, as previously explained, enables us to employ a truly cylindric chamber in combination with rigid or one-piece blades—that is to say, blades which are rigid from one projecting end to the other. This is broadly new and is, it will be seen, accomplished by employing rigid blades the width of each one of which is considerably less than the diameter of the chamber. We are therefore the first to employ the combination of a truly cylindric chamber, an eccentric drum, and blades or vanes which are rigid and practically composed of one piece from one contact edge to the other. In other words, we are the first to obviate certain objections and disadvantages peculiar to the old style of blower by employing a truly circular cylindric casing in combination with an eccentric drum and rigid or one-piece blades.

What we claim as our invention is—

1. A rotary blower comprising a truly cylindric chamber, a cylindrical drum mounted eccentrically within said chamber, a blade slidably mounted in said drum and of a length to project at each side of the drum, said blade being rigid and continuous from one side to the other, the diameter of said chamber being greater than the width of said blade, and rolls mounted on the projecting portions of said blade and adapted to travel in arc-shaped ways formed on the inner surface of the casing, said ways being adapted to cause the rolls to successively maintain the opposite edges of said blade in contact, or substantially in contact, with the inner surface of the casing while traversing the space between the said surface and the drum.

2. A rotary blower comprising a casing having a truly cylindrical chamber, heads secured to said casing and provided with arc-shaped ways, an eccentrically-arranged drum mounted for rotation within said chamber, a blade rigid from side to side and of a width to extend transversely through the drum, the diameter of said chamber being greater than the width of said blade, and rolls mounted upon the ends of said blade and arranged to travel in said ways.

3. A rotary blower comprising a casing having a truly cylindrical chamber, a rotary drum mounted eccentrically within said chamber, a pair of blades slidably mounted in said drum and crossing each other at right angles, each blade being of a width to extend through and project at each side of the drum, but the width of each blade being less than the inner diameter of said chamber, arc-shaped ways formed on the inner surface of the casing and located at each end of the space between the drum and the inner surface of the casing, and rolls mounted on the projecting side portions of said blades and adapted to travel in the said ways, said ways thereby causing the rolls to successively maintain the oppositely-projecting edges of the said blades in contact, or substantially in contact, with the inner surface of the casing while traversing the space between the said surface and the said drum.

4. A rotary blower comprising a truly cylindrical chamber, a rotary drum mounted eccentrically within said chamber, blades extending through said drum, each blade being rigid from side to side and of a width to extend transversely through the drum, the diameter of the chamber being greater than the width of each blade, cylinder-heads provided with arc-shaped ways, rolls mounted at the corners of the blades and adapted to travel in said ways, and recesses or pockets formed in the surface of the drum and adapted to receive said rolls.

5. A rotary blower comprising a casing having a truly cylindrical chamber, cylinder-heads provided with arc-shaped ways, a rotary drum mounted eccentrically within said chamber, and a blade rigid from side to side and of a width to extend transversely through the drum, the four corners of the blade being provided with projections adapted to travel in said ways, the diameter of said chamber being greater than the width of said blade.

6. A rotary blower comprising a truly cylindrical chamber, a rotary drum mounted eccentrically therein, a blade rigid from side to side and of a width to extend transversely through said drum, said blade having a central opening, another blade having a reduced middle portion adapted to extend through said opening, the blade thus reduced at its middle portion being made in two parts which are rigidly connected, arc-shaped ways formed in the casing or body of the blower, and projections on the ends of the blades adapted to travel in said ways.

7. A rotary blower comprising a casing having a truly cylindrical chamber, a rotary drum mounted eccentrically within said chamber, a pair of blades carried by the drum and arranged for relative shift or sliding movement, each blade being rigid from side to side and of a width to extend transversely through the drum, cylinder-heads provided with arc-shaped ways, and rolls mounted upon the corners of said blades and arranged to travel in said ways.

8. A rotary blower comprising a casing having a truly cylindrical chamber, a rotary drum mounted eccentrically within said chamber, a pair of blades carried by said drum and crossing each other at right angles, one being made in two parts and provided with a reduced middle portion extending through a central opening in the other blade, arc-shaped ways formed in the casing or body, and rolls carried at the corners of the blades and adapted to travel in said ways.

9. In a rotary blower, the combination of a truly cylindrical chamber, an eccentric drum mounted for rotation in said chamber, and a blade slidably mounted in said drum and of a width to project at each side thereof, the diameter of said chamber being greater than the width of said blade, and guiding means whereby the two projecting portions of the blade alternately sink below the surface of the drum at one side, and alternately engage the inner surface of the casing at the other side.

10. A rotary blower comprising a casing having a truly cylindrical chamber, a rotary drum mounted eccentrically within said chamber, a pair of blades carried by the drum and crossing each other at right angles, the relative formation of the blades being such as to permit them to slide or move relatively to each other, each blade being rigid from side to side and of a width to extend transversely through the drum, the diameter of the chamber being greater than the width of the blades, cylinder-heads formed with arc-shaped ways, and projections on the blades adapted to travel in said ways.

11. A rotary blower comprising a truly cylindrical chamber, cylinder-heads closing the ends of the cylinder and provided with bearings, a rotary drum mounted eccentrically within said chamber and having closed ends, the end walls of the drums being provided with journals adapted to rotate in said bearings, a blade rigid from side to side and of a width to extend transversely through said drum, the diameter of said chamber being greater than the width of said blade, and guiding means for said blade adapted to successively maintain the opposite edges of the blade in contact, or substantially in contact, with the inner surface of the chamber.

12. A rotary blower comprising a casing having a truly cylindrical chamber, cylinder-heads formed with inwardly-projecting crescent-shaped portions, a rotary drum mounted eccentrically within said chamber, blades extending through said drum, and rolls carried at the corners of the blades and adapted to travel in arc-shaped ways formed between the said crescent-shaped portions and the inner cylindric surface of the casing, the diameter of the chamber being greater than the width of said blades.

Signed by us at Chicago, Cook county, Illinois, this 30th day of January, 1902.

PAUL FORWERG.
BERTINIUS LARSEN.

Witnesses:
ARTHUR F. DURAND,
HARRY P. BAUMGARTNER.